J. T. CRENSHAW.
TOBACCO PLANTER.
APPLICATION FILED FEB. 18, 1907.
No. 901,279.
Patented Oct. 13, 1908.
2 SHEETS—SHEET 1.
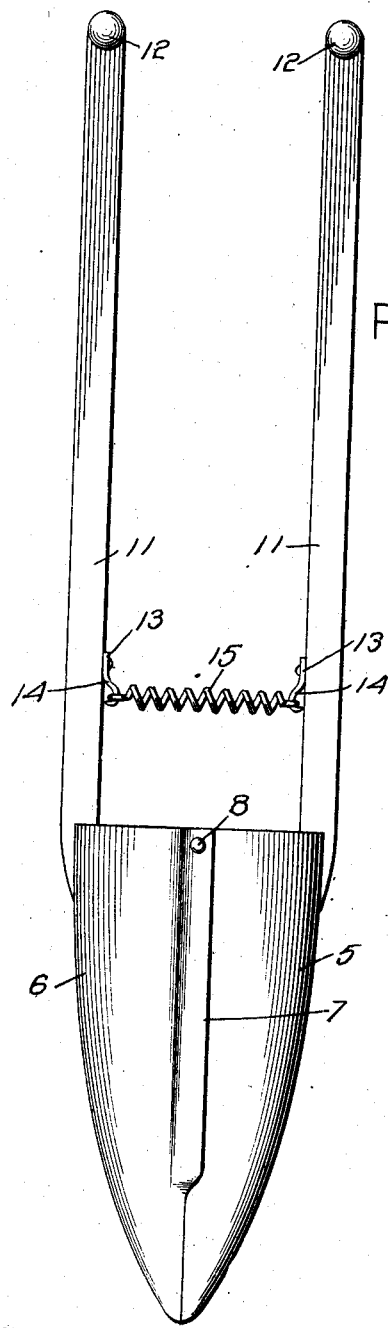
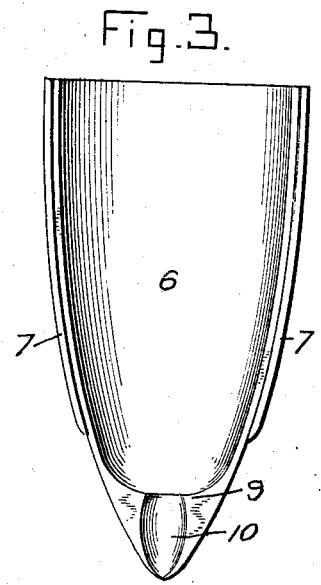

J. T. CRENSHAW.
TOBACCO PLANTER.
APPLICATION FILED FEB. 18, 1907

901,279.

Patented Oct. 13 1908.
2 SHEETS—SHEET 2.

Witnesses
Inventor
J. T. Crenshaw
By
Attorneys

UNITED STATES PATENT OFFICE.

JOHN T. CRENSHAW, OF JETERSVILLE, VIRGINIA, ASSIGNOR OF ONE-HALF TO JOSEPH McCARTHY, OF APPLETON, WISCONSIN.

TOBACCO-PLANTER.

No. 901,279.  Specification of Letters Patent.  Patented Oct. 13, 1908.

Application filed February 18, 1907. Serial No. 357,907.

*To all whom it may concern:*

Be it known that I, JOHN T. CRENSHAW, a citizen of the United States, residing at Jetersville, in the county of Amelia, State of Virginia, have invented certain new and useful Improvements in Tobacco-Planters; and I do hereby declare the following to be a full, clear, and exact description of the invention, such as will enable others skilled in the art to which it appertains to make and use the same.

This invention relates to tobacco planters and has for its object to provide a very simple implement of this character which will completely inclose the plant while the implement is being inserted into the ground and thereby protect the plant while being planted.

The prime novel feature in my invention resides in the peculiar formation of the two members which comprise the plant receiving bowl. Each of these members is formed with a large concavity and with a small concavity below the large concavity, that portion of the walls of the members in which the smaller concavities are formed being of considerably greater thickness than the other portion so that a larger hole will be formed in the ground than will be filled by the root of the plant. The particular advantage derived from such a construction lies in the fact that loose earth may be packed around the roots of the plant after the plant has been deposited. While it is true that other tobacco planters have been formed with a plant receiving bowl and a root receiving bowl of less size than the plant receiving bowl, nevertheless, the walls of the bowl have been formed of the same thickness throughout and consequently when the plant is deposited, its roots are surrounded by hard soil and it is impossible to pack loose soil or suitable fertilizer around the roots.

Figure 2:
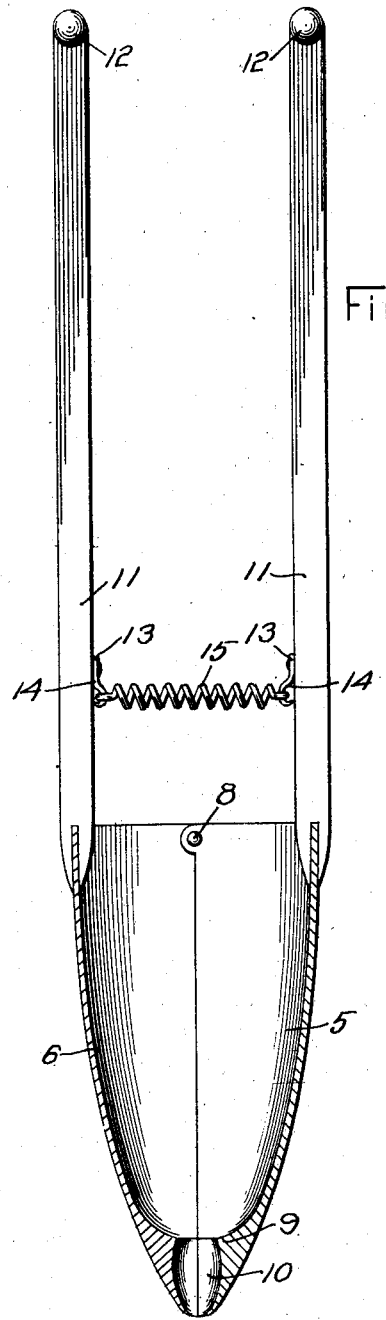
Figure 4:
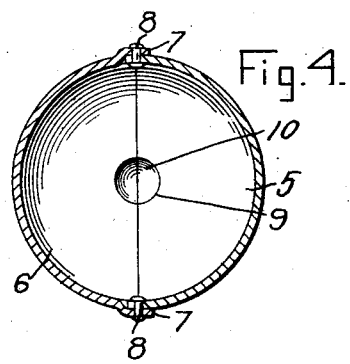

In the accompanying drawings—Figure 1 is a view in elevation of my implement. Fig. 2 is a detailed vertical sectional view of the same taken in a line with the handle. Fig. 3 is a view in elevation of one of the semi-conical members, and, Fig. 4 is a detailed horizontal sectional view therethrough taken at their pivotal points.

As shown in the drawings, the device comprises a bowl made up of two substantially semi-conical members one of which is indicated by the numeral 5 and the other by the numeral 6. The main portions of the edges of the member 6 overlap the corresponding portions of member 5 as indicated at 7 and pivot pins 8 are engaged through these edges adjacent the upper end of the member and serve to pivotally connect the same. As is clearly shown in the drawings each of the members is formed with a major and a minor concavity, the major concavity being for the reception of the plant and the minor concavity which is indicated by the numeral 9 being designed for the reception of the root of the plant.

In carrying out my invention, I have conceived the idea of forming the portions of the wall of the member in which the minor concavities 10 are formed, thicker than the remaining portions of the walls. By so forming the walls, a larger opening is made in the ground than is in reality necessary to receive the roots of the plant and this permits of loose soil and fertilizer being packed around the roots.

Attached to each member at its upper end is a handle 11 provided at its upper end with a hand piece 12. Bolted or otherwise secured to each of the handles, at corresponding points, is a small plate 13 formed with a hook 14 which has its bill turned downwardly and inwardly toward the respective handle and slightly spaced therefrom. A spring 15 is connected at its ends with the hooks and this spring exerts a tendency normally to open the members or in other words to spread them so that they may receive a tobacco or other plant for planting. It will be understood that by the construction just described, the spring may be readily disengaged from its hook and a new spring supplied or the original spring recompressed.

While the major portion of the edges of the member 6 has been described as overlapping the corresponding portions of the edges of the member 5, the remaining portions of the edges of the two members or rather their lower ends abut each other when the members are closed.

In using my implement, a plant is placed between the members and in the large bowl formed by the major concavities, the roots of the plant being received in the smaller bowl formed by the minor concavities 10. The implement is then forced into the ground and the bowl forming members afterwards slightly spread and the implement then withdrawn. Loose soil and suitable fertilizer is then packed around the roots of the plant and the hole formed by the implement is then completely filled in.

What is claimed is—

An implement of the class described comprising pivoted bowl forming members, each of the said members being formed with a major concavity for receiving a plant and a minor concavity for receiving the roots of the plant, the portions of the walls in which the minor concavities are formed being of considerably greater thickness than the portions of the walls in which the major concavities are formed.

In testimony whereof, I affix my signature, in presence of two witnesses.

JOHN T. CRENSHAW.

Witnesses:
W. S. HOLMAN,
R. A. FARRAR.